(12) United States Patent
Kurumada

(10) Patent No.: US 6,366,264 B1
(45) Date of Patent: Apr. 2, 2002

(54) STRUCTURE FOR MOUNTING DRIVER MODULE OF FLAT PANEL DISPLAY

(75) Inventor: Masakazu Kurumada, Fukuroi (JP)

(73) Assignees: Pioneer Electronic Corporation, Tokyo; Shizuoka Pioneer Electrojic Corporation, Fukuroi, both of (JP)

(*) Notice: Subject to any disclaimer, the term of this patent is extended or adjusted under 35 U.S.C. 154(b) by 0 days.

(21) Appl. No.: 09/366,556

(22) Filed: Aug. 4, 1999

(30) Foreign Application Priority Data

Aug. 5, 1998 (JP) .......................... 10-222010

(51) Int. Cl.$^7$ .............. G09G 3/28; G09G 3/36
(52) U.S. Cl. .............. 345/60; 345/87; 349/58; 315/169.4
(58) Field of Search .................. 345/60, 87, 104, 345/74, 80; 349/58, 56, 60; 315/169.4

(56) References Cited

U.S. PATENT DOCUMENTS 5,517,208 A * 5/1996 Mori et al. .................. 345/87
5,590,024 A * 12/1996 Honda et al. ................ 361/684
5,963,287 A * 10/1999 Asada et al. ................ 349/150
6,040,811 A * 3/2000 Malhi .......................... 345/87

* cited by examiner

Primary Examiner—Bipin Shalwala
Assistant Examiner—Jimmy H. Nguyen
(74) Attorney, Agent, or Firm—Morgan, Lewis & Bockius LLP

(57) ABSTRACT

The present invention includes a structure for mounting the driver module of a flat panel display to its display panel such that the depth and width of the display can be made smaller than in a conventional flat panel display. A flexible printed circuit extends from its position mounted to a PDP glass panel along a side surface of a metallic chassis and is bent to a direction vertical to the glass panel such that the flexible printed circuit extends rearwardly. An IC chip and a chip capacitor are disposed between a straight portion of the flexible printed circuit and a side surface of the chassis and connected with the flexible printed circuit.

6 Claims, 5 Drawing Sheets

STRUCTURE FOR MOUNTING DRIVER MODULE OF FLAT PANEL DISPLAY

This Application claims the benefit of Japanese Application No. 10-222010 filed on Aug. 5, 1998, which is hereby incorporated by reference.

BACKGROUND OF THE INVENTION

1. Field of the Invention

The present invention relates to a flat panel display, such as a plasma display or a liquid crystal display and, more particularly, to a structure for mounting a module such as a driver circuit to the display panel of such a plasma display or liquid crystal display.

2. Description of the Related Art

Flat panel displays (FPDs) such as plasma display panels (PDPs) and liquid crystal displays (LCDs) can provide a large-area display without needing a large footprint. Because of this and other advantages, flat panel displays have been developed earnestly in recent years.

In such a flat panel display (e.g., a PDP or an LCD), electrode arrays are disposed inside a base plate. A driving voltage is applied to these electrode arrays from a driver circuit via connector terminals to create a frame of an image on a display panel.

FIG. 8 shows a structure for mounting a module such as a driver circuit to the display panel of a conventional PDP. The driver circuit 2 applies a driving voltage to electrode arrays (not shown) in a PDP glass panel 1. The driver circuit 2 is mounted to the back surface of a chassis 3 that supports the glass panel 1 from behind it and dissipates heat from the panel 1.

The driver circuit 2 is connected with the PDP panel glass panel 1 by a flexible printed circuit (FPC) 4, curved along a side surface of the chassis 3. The driver circuit 2 includes a printed circuit board 2B mounted on a heat-dissipating plate 2A and an IC chip 2C. The driver circuit 2 is connected with the flexible printed circuit 4 by connecting the flexible printed circuit 4 with the printed circuit board 2B via anisotropic conductive film (ACF). A circuit board 5 controls the driver circuit 2 and is connected with the printed circuit board 2B of the driver circuit 2 via a flexible connector 6.

Although the benefits of a flat panel display such as a PDP is that it has a relatively small depth and a small footprint while providing a large display, the conventional structure for mounting the driver circuit 2 requires that all of the components of the driver circuit 2 are disposed behind the chassis 3, which makes the display device thicker. Furthermore, the conventional structure connecting the driver circuit 2 and the circuit board 5 is complex, thus necessitating a large number of assembly steps. In addition, in order to connect the PDP glass panel 1 and the driver circuit 2, the flexible printed circuit 4 must be curved around the chassis until it becomes parallel to the panel 1 at the rear side from the front side of the PDP. To prevent the flexible printed circuit from bending during this operation, the curved portion must have a considerable diameter. Therefore, the flexible printed circuit projects laterally for the PDP glass panel 1. This increases the width of the PDP accordingly, rendering the PDP to be larger, and increasing the length of the flexible printed circuit 4. This induces noises and increases the possibility of breaks in metal lines.

SUMMARY OF THE INVENTION

The present invention has been made to solve the foregoing problems associated with the prior art structure for mounting a module such as a driver circuit of a flat panel display.

It is a first object of the present invention to provide a module-mounting structure for use in a flat panel display to reduce the depth and the width of the display.

It is a second object of the invention to provide a module-mounting structure that neither induces noises nor introduces breaks in metal lines.

It is a third object of the invention to provide a module-mounting structure having a simplified structure that requires fewer assembly steps.

A first embodiment of the present invention provides a driver module-mounting structure for use in a flat panel display and is intended to achieve the aforementioned first and second objects. The flat panel display has a display panel, a chassis member for supporting the display panel from behind, and a driver module for displaying an image on the display panel. A flexible printed circuit connects the display panel and the driver module and has a mounting portion to be mounted to the display panel. The flexible printed circuit extends from its mounting portion along the outer wall of the chassis member in the rearward direction of the display panel. Components of the driver modules are disposed between the flexible printed circuit and the outer wall of the chassis member and are connected with the flexible printed circuit.

The driver module-mounting structure in accordance with the first embodiment of the invention for use in a flat panel display has a flexible printed circuit that connects a display panel and a driver module for displaying an image on the display panel. A chassis member holds the rear side of the display panel. The flexible printed circuit extends along the outer wall of the chassis member from its mounting portion, substantially perpendicular to the display panel behind it.

All or some of the components of the driver module are placed in a space formed between the portion of the flexible printed circuit extending along the outer wall of the chassis member and the outer wall of the chassis member. The components of the driver module are connected with the surface of the flexible printed circuit that is opposite to the outer wall of the chassis member.

In the first embodiment of the invention as described above, the driver module displays an image on the display panel by applying a driving voltage to the display panel. The components of this driver module are arranged at the outer wall of the chassis located on fringes of the display panel, instead of at the rear side of the chassis supporting the display panel as in the conventional display. Therefore, the depth of the flat panel display can be smaller than that of the conventional flat panel display. Since the components of the driver module are positioned in the space formed between the flexible printed circuit and the outer wall of the chassis member, neither the width nor the height of the flat panel display is increased, in spite of the placement of this driver module.

Furthermore, it is not necessary to bend the flexible printed circuit toward the rear side of the chassis from the front side of the display panel as much as compared with the prior art display. The diameter of the curved portion, when the flexible printed circuit is curved, can be smaller than in the conventional display. Consequently, the width and the height of the flat panel display can be reduced. Moreover, the flexible printed circuit itself also can be smaller such that the flexible printed circuit does not induce noises and there is less danger of breaks in metal lines.

A driver module-mounting structure in accordance with a second embodiment of the invention for use in a flat panel display has the general configuration of the first embodiment as described above. To achieve the first and third objects described above, the components of the driver module that are located between the flexible printed circuit and the outer wall of the chassis member are made to abut against the outer wall of the chassis member.

In the driver module-mounting structure in accordance with the second embodiment of the invention for use in the flat panel display, the components of the driver modules bear against a metallic chassis acting as a heat-dissipating plate or sheet for the display panel. The chassis also serves as a heat-dissipating plate for the driver module. Therefore, the second embodiment of the invention yields the advantages of the first embodiment of the invention. In addition, any structure for dissipating heat from the driver module can be dispensed with, such that the flat panel display structure can be made simpler.

A driver module-mounting structure in accordance with the third embodiment of the present invention for use in the flat panel display has the configuration of the aforementioned second embodiment of the invention. In addition, to achieve the first and third objects described above, the components of the driver module bear against the outer wall of the chassis member via a heat-dissipating sheet member. In the driver module-mounting structure in accordance with the third embodiment of the invention transfer of heat from the components of the driver module to the chassis member is promoted by the heat-dissipating sheet member. This can further simplify the structure for dissipating heat from the driver module.

A module-mounting structure in accordance with a fourth embodiment of the invention for use in the flat panel display has the configuration of the first embodiment described above. To achieve the third object described above, it further has a connector member for connecting other components of the driver module with the flexible printed circuit. The connector member is located on the back surface of the chassis member. The connector member has a pressure contact terminal pressed against the end portion of the flexible printed circuit, extending along the outer wall of the chassis member. As a result, the connector member is connected with the flexible printed circuit. In this embodiment of the invention, the pressure contact terminal of the connector terminal is pressed against the rear end of the flexible printed circuit extending along the outer wall of the chassis member, to connect with the flexible printed circuit.

Accordingly, in the fourth embodiment of the present invention, the connector member and the flexible printed circuit can be connected in one-touch operation during assembly of the flat panel display. Therefore, the flat panel display can be assembled with less number of steps than in a conventional display.

A module-mounting structure in accordance with a fifth embodiment of the invention for use in the flat panel display has the configuration of the first embodiment of the invention described above. In addition, to achieve the second object as described above, a support member that is fixed to the chassis member bears against at least the surface of the flexible printed circuit, opposite to the surface pushed against the pressure contact terminal of the connector member. In this embodiment, the portion of the flexible printed circuit connected with the connector member is held by the support member that is located on the opposite side of the flexible printed circuit from the connector member and securely mounted to the chassis. Hence, the flexible printed circuit can resist the pushing force of the pressure contact terminal of the connector member, and there is no danger of breaks in metal lines.

A driver module-mounting structure in accordance with a sixth embodiment of the present invention for use in the flat panel display has the configuration of the fifth embodiment of the invention. In addition, to achieve the third object described above, the aforementioned support member is fixedly mounted to the chassis by engagement of resilient hook portions formed on the support member with engaging portions of the chassis member. In this embodiment of the invention described above, the support member holding at least the portion of the flexible printed circuit connected with the connector member is mounted to the chassis by elastic engagement of the hook portions of the support member with the engaging portions of the chassis member. Therefore, they can be assembled in one-touch operation. This can reduce the number of assembly operations.

A driver module-mounting structure in accordance with a seventh embodiment of the present invention is for use in the flat panel display and based on the configuration of the first embodiment. To achieve the first object described above, a plasma display is used as the flat panel display, and the components of the driver module take the form of a semiconductor integrated circuit for applying a driving voltage to the electrode arrays in the display panel of the plasma display. In this embodiment of the invention, the semiconductor integrated circuit for applying a driving voltage to the electrode arrays of the display panel is located on fringes of the display panel. In the past, the semiconductor integrated circuit has been positioned behind the display panel of the plasma display. Accordingly, the comparatively small depth required for the display can be further reduced, while the width or the height can also be decreased.

Other objects and features of the invention will appear in the course of the description thereof, which follows.

DETAILED DESCRIPTION OF THE PREFERRED EMBODIMENT

The preferred embodiments of the present invention are hereinafter described by referring to the accompanying drawings. The invention can be applied to LCDs and other flat panel displays, as well as PDPs (plasma display panels).

Furthermore, the invention can be applied for mounting various modules. In the description given below, the invention is applied to a structure for mounting a driver circuit of a PDP.

Figure 1:
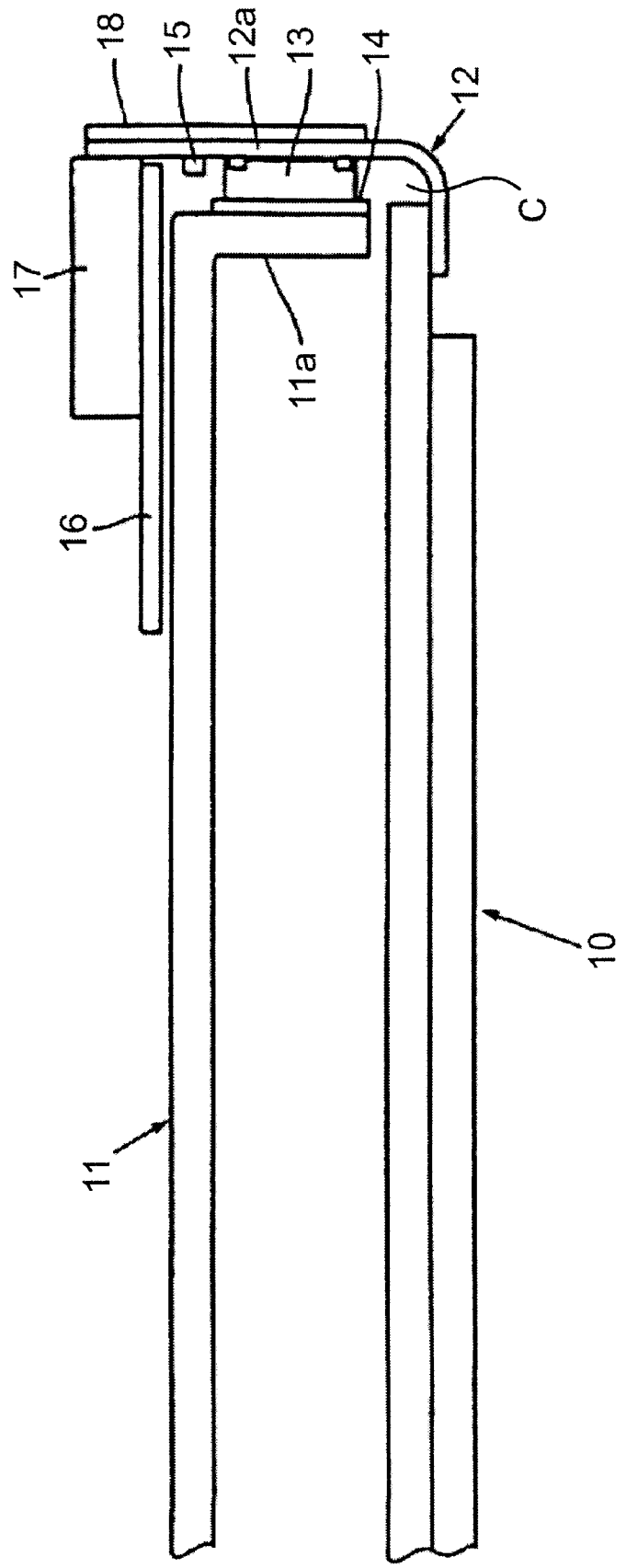
FIG. 1 is a plan view of a driver module-mounting structure for use in a flat panel display in accordance with the present invention.

FIG. 1 is a plan view of the PDP as viewed from above. A PDP glass panel 10 is mounted on the front face of the PDP and supported by a metallic chassis 11 located behind the panel 10.

The front end (the lower side as viewed in FIG. 1) of a flexible printed circuit (FPC) 12 is mounted to the front side of the PDP glass panel 10 and connected with a number of electrode arrays (not shown) in the glass panel 10.

As can be seen from FIG. 1, the portion of the flexible printed circuit 12 that is mounted to the front side of the PDP glass panel 10 extends parallel to the panel 10. Outside of the lateral side of the glass panel 10, the flexible printed circuit 12 is bent with a minimum diameter within the range of tolerable bending stresses in a direction substantially vertical to the glass panel 10 and extends rearwardly (upwards as viewed in FIG. 1).

The straight portion 12a of the flexible printed circuit 12 extends rearwardly from the PDP glass panel 10. A space C having a width substantially the same as the radius of the curved portion of the flexible printed circuit 12 is formed between the straight portion 12a of the circuit 12 and a side surface 11a of the metallic chassis 11. An IC chip 13 is inserted in the space C.

The surface of the IC chip 13 opposite to the flexible printed circuit 12 is connected with the flexible printed circuit 12 by anisotropic conductive film (ACF). The surface opposite to the metallic chassis 11 bears against the side surface 11a of the chassis 11 via the heat-dissipating sheet 14. A chip capacitor 15 is inserted in the space C and connected and fixed to the inside of the straight portion 12a of the flexible printed circuit 12.

A circuit board 16 is mounted adjacent to the end of the flexible printed circuit 12 extending from the PDP glass panel 10 behind the metallic chassis 11. A pressure contact connector 17 is mounted on the circuit board 16.

Figure 2:
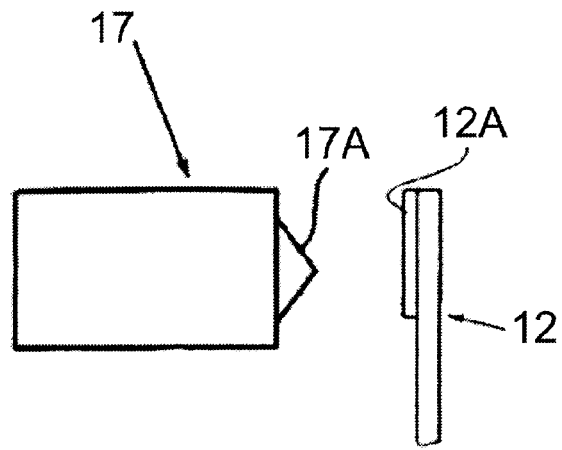
FIG. 2 is an enlarged view of a part of the driver module-mounting structure shown in FIG. 1, illustrating the manner in which a pressure contact connector is connected with a flexible printed circuit (FPC)

As shown in FIG. 2, the pressure contact connector 17 has a connector terminal 17A that is a leaf spring-loaded terminal and pressed against a terminal portion 12A at an end of the flexible printed circuit 12. The spring force of the connector terminal 17A connects the circuit board 16 and the flexible printed circuit 12.

A module support plate 18 bears on, and is mounted to, the outer surface of the straight portion 12a of the flexible printed circuit 12. Thus, the flexible printed circuit 12, the IC chip 13, and the heat-dissipating sheet 14 are pressed against the side surface of the metallic chassis 11, whereby the sheet 14 is fixedly mounted to the chassis 11. The terminal portion 12A of the flexible printed circuit 12 is supported from outside. This assures electrical connection with the connector terminal 17A of the pressure contact connector 17.

Figure 3:
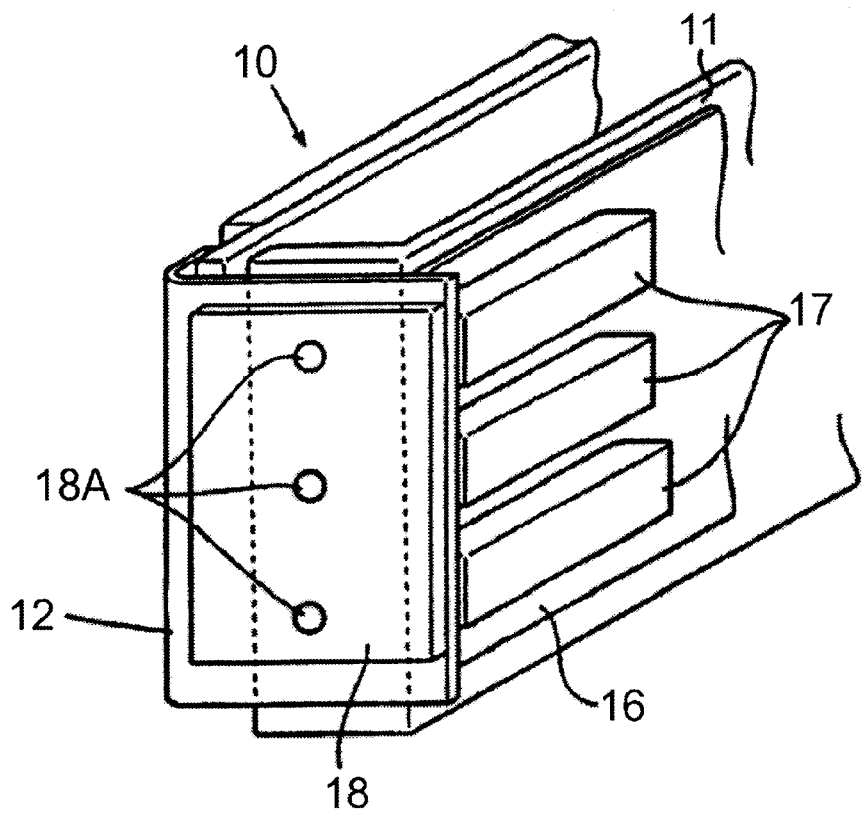
FIG. 3 is a fragmentary perspective view of the driver module-mounting structure shown in FIG. 1, illustrating a method of mounting a module support plate.
Figure 4:
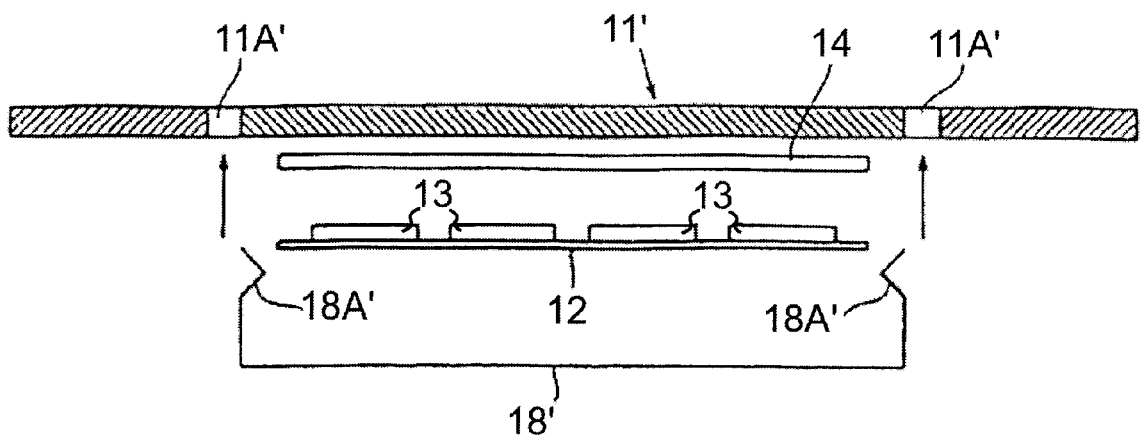
FIG. 4 is a fragmentary cross section of the driver module-mounting structure shown in FIG. 1, illustrating another method of mounting the module support plate.

The module support plate 18 is mounted by mounting it to the metallic chassis 11 at plural locations by screws 18A, as shown in FIG. 3. Alternatively, as shown in FIG. 4, resilient hooks 18A' formed at opposite ends of a module support plate 18' may be resiliently engaged in a pair of engaging holes 11A' formed in side surfaces of a metallic chassis 11'.

The IC chip 13 and the chip capacitor 15 are main components of the driver circuit module for applying a driving voltage to the PDP glass panel 10. Since these IC chip 13 and chip capacitor 15 are installed at a side of the chassis 11, the PDP is thinner than one in which the driver circuit module is mounted to the backside of the chassis 11.

Furthermore, the flexible printed circuit 12 needs not be bent to a direction parallel to the backside of the metallic chassis 11, unlike in the prior art technique. It is only necessary that the flexible printed circuit 12 be bent in a direction that is substantially vertical to the PDP glass panel 10 and extending rearwardly from the PDP glass panel. The radius of the curved portion is therefore smaller than in a conventional display, and the width of the PDP is reduced accordingly.

Since the IC chip 13 and the chip capacitor 15 forming the driver circuit are disposed in the space C formed between the flexible printed circuit 12 and the side surface 11a of the metallic chassis 11, it is not necessary to increase the width of the PDP to permit the IC chip 13 and the chip capacitor 15 to be mounted.

The IC chip 13 abuts against the metallic chassis 11 via the heat-dissipating sheet 14 and so the chassis 11 acts as a heat-dissipating plate for the IC chip 13. Therefore, any other structure for heat dissipation is not necessary. Consequently, the structure is simplified.

Where good thermal transfer is secured between the IC chip 13 and the metallic chassis 11, the IC chip 13 may be brought into direct contact with the metallic chassis 11 without necessitating the heat-dissipating sheet 14. Furthermore, the area of the flexible printed circuit 12 is reduced, because it is not necessary that the flexible printed circuit 12 be bent to the rear side of the chassis 11. Because of this, noises are not induced, and there is little danger of breaks in metal lines.

The circuit board 16 for controlling the driver circuit is connected with the flexible printed circuit 12 simply by pressing the terminal 17A of the pressure contact connector 17 against the terminal portion 12A of the flexible printed circuit 12. Consequently, the PDP can be assembled with fewer steps.

Figure 5:
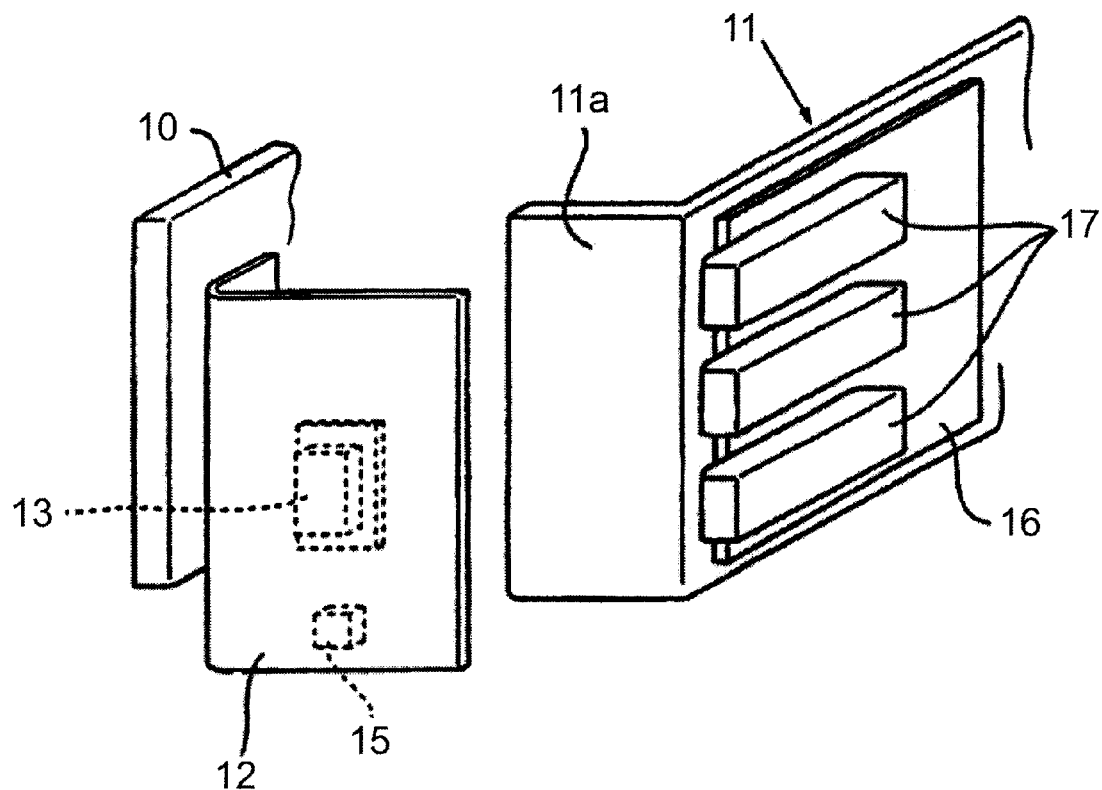
FIG. 5 is a perspective view of an IC chip and a chip capacitor, showing another arrangement in accordance with the invention.

FIG. 5 shows another arrangement of the IC chip 13 and the chip capacitor 15 mounted to the flexible printed circuit 12. In the example shown in FIG. 1, the IC chip 13 and the chip capacitor 15 are oriented vertical to the PDP glass panel 10. In this example, the IC chip 13 and the chip capacitor 15 are oriented parallel to the PDP glass panel 10.

Figure 6:
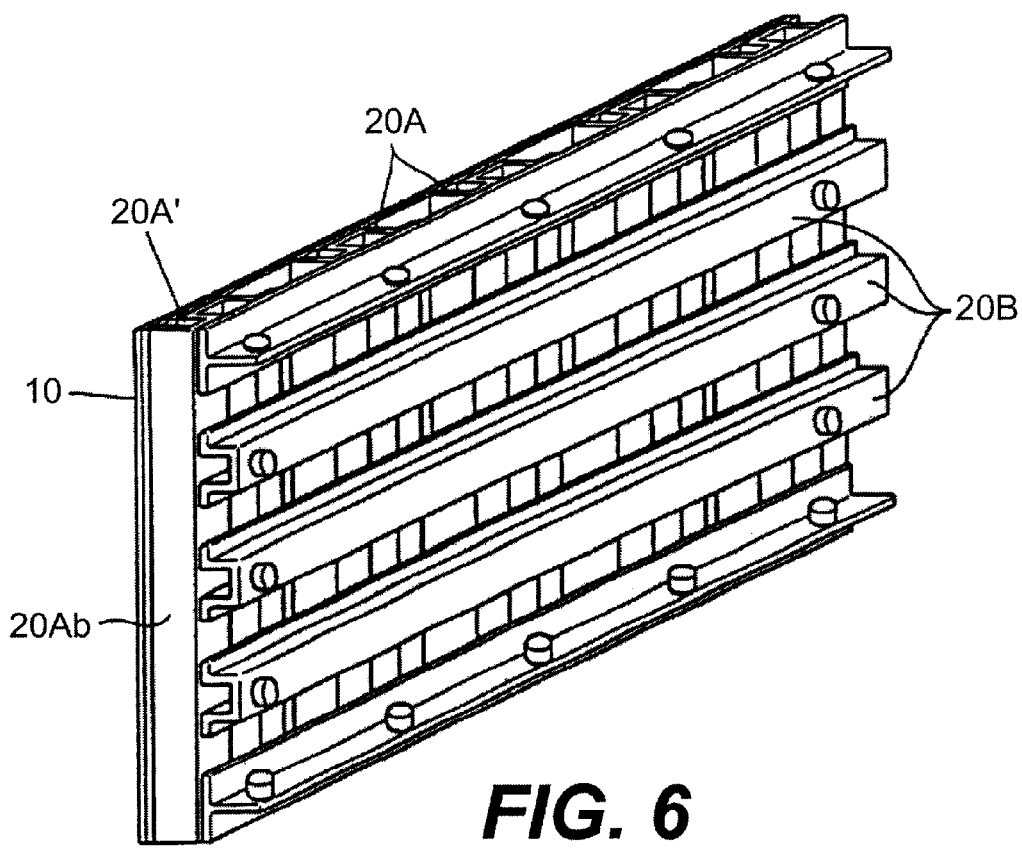
FIG. 6 is a perspective view of other metallic chassis in accordance with the invention.

FIG. 6 shows an embodiment of the invention in which a metallic chassis 20 on the PDP glass panel 10 is composed of vertical frames 20A extending vertically and parallel to each other and horizontal frames 20B extending horizontally and parallel to each other. That is, the chassis consists of beams crossing each other.

Figure 7:
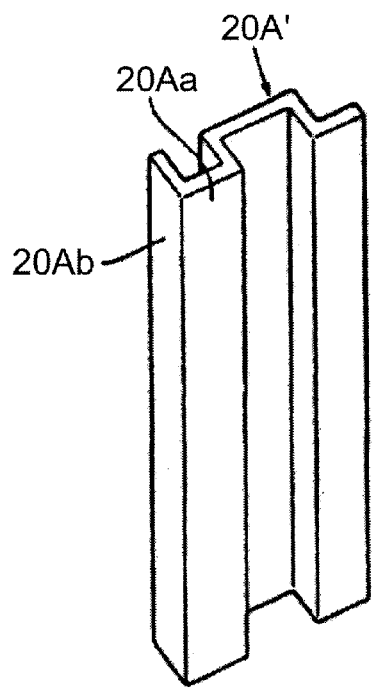
FIG. 7 is a perspective view of a vertical frame of the metallic chassis shown in FIG. 6, and in which an IC chip is mounted to the vertical frame.
Figure 8:
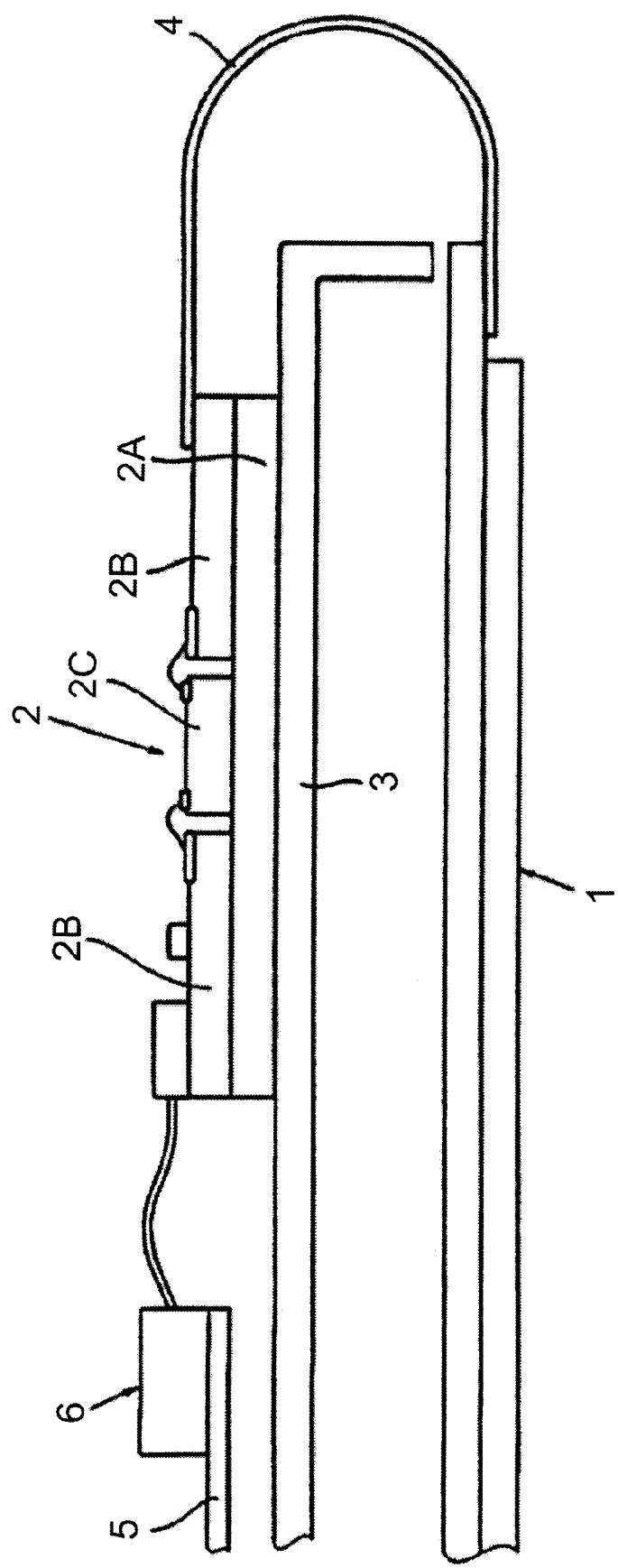
FIG. 8 is a plan view of a convention flat panel display construction.

In this embodiment, one vertical frame 20A' of the vertical frames 20A of the metallic chassis 20 to which the driver circuit module is mounted is shown enlarged in FIG. 7. This vertical frame 20A' has a wall surface 20Ab extending vertical to the PDP glass panel 10 from the front end of a flange 20Aa extending parallel to the glass panel 10.

In the same way as in the case of FIG. 1, the flexible printed circuit extends along the wall surface 20Ab of the vertical frame 20A'. The components of the driver module including the IC chip and the chip capacitor are located between the wall surface 20Ab of the vertical frame 20A' and the flexible printed circuit.

In the embodiments described above, the driver module for displaying an image is mounted to one side of the PDP glass panel. The driver module may be mounted to the other side, the top, or the bottom of the PDP glass panel by a similar structure.

What is claimed is:

1. A structure for mounting a driver module to a flat panel display having a display panel on which an image is displayed by the driver module, the structure comprising:

a chassis member for supporting the display panel from the rear side of the display panel, said chassis member having an outer wall;

a flexible printed circuit for connecting the display panel and the driver module, the flexible printed circuit being mounted to the display panel at a mounting portion and extending from the mounting portion along the outer wall of said chassis member in a rearward direction from the display panel; and components of the driver module being disposed between the flexible printed circuit and the outer wall of the chassis member and connected with the flexible printed circuit, wherein a connector member for connecting other components of said driver module with the flexible printed circuit is disposed behind the chassis member and has a pressure contact terminal, and wherein the pressure contact terminal is pressed against an end portion of the flexible printed circuit extending along the outer wall of said chassis member, whereby the connector member is connected with the flexible printed circuit.

2. The flat panel display structure of claim 1, wherein the components of the driver module disposed between the flexible printed circuit and the outer wall of said chassis member are positioned to be against the outer wall of the chassis member.

3. The flat panel display structure of claim 2, wherein the components of said driver module bear against the outer wall of said chassis member via a heat-dissipating sheet member.

4. The flat panel display structure of claim 1, wherein a support member fixedly mounted to said chassis member bears against at least a surface of the flexible printed circuit opposite to the surface pressed against the pressure contact terminal of said connector member.

5. The flat panel display structure of claim 4, wherein the support member has resilient hook portions that engage with engaging portions of the chassis member, whereby the support member is fixedly mounted on the chassis member.

6. The structure of claim 1, wherein the flat panel display is a plasma display, and wherein the components of the driver modules are a semiconductor integrated circuit for applying a driving voltage to electrode arrays in the display panel of the plasma display.

* * * * *